United States Patent [19]

Oelke

[11] 4,428,588

[45] Jan. 31, 1984

[54] RADIAL BELLEVILLE SEAL WITH ENCAPSULATED RESILIENT CORE MEMBER

[75] Inventor: Erwin S. Oelke, Cypress, Calif.

[73] Assignee: Smith International, Inc., Newport Beach, Calif.

[21] Appl. No.: 415,081

[22] Filed: Sep. 7, 1982

[51] Int. Cl.³ .............................................. F16J 15/34
[52] U.S. Cl. ....................................... 277/83; 277/92; 277/95; 277/84; 277/166
[58] Field of Search ................. 277/83, 84, 92, 95, 277/165, 166, 177, 186, 189, 81 R, 12, 32

[56] References Cited

U.S. PATENT DOCUMENTS

| | | | |
|---|---|---|---|
| 3,075,781 | 1/1963 | Atkinson et al. | 277/83 |
| 3,137,508 | 6/1964 | Cunningham | 277/95 |
| 3,397,928 | 8/1968 | Galle | 277/92 X |
| 3,467,448 | 9/1969 | Galle | 277/81 R X |
| 3,480,338 | 11/1969 | Durham et al. | 277/92 X |
| 3,944,306 | 3/1976 | Neilson | 277/95 X |
| 4,344,629 | 8/1982 | Oelke | 277/84 X |

FOREIGN PATENT DOCUMENTS 2326047 12/1973 Fed. Rep. of Germany ...... 277/165

*Primary Examiner*—Robert S. Ward
*Attorney, Agent, or Firm*—Robert G. Upton

[57] ABSTRACT

A novel annular seal packing ring, frustoconical in form with a parallelogram cross section. When loaded into a rectangular seal gland groove, the smaller diameter end is biased radially inward and the larger end is biased radially outward against the gland. The bias is developed primarily in a centrally encapsulated annular spring band. The largest outside diameter and the smallest inside diameter constitute the sealing surfaces of the seal ring.

17 Claims, 5 Drawing Figures

RADIAL BELLEVILLE SEAL WITH ENCAPSULATED RESILIENT CORE MEMBER

BACKGROUND OF THE INVENTION

1. Field of the Invention

This invention pertains to heavy-duty environmental shaft seals and, more particularly, to those seals which environmentally protect the bearings of sealed bearing rolling cone rock bits.

Such seals are critical in the drilling of wells for the search for and the production of oil. Operating beneath a column of destructively abrasive liquid slurry, a sealed bearing rock bit cannot last much longer than its seals.

As wells are drilled deeper, progressively more unproductive time and labor must be spent retracting the drill pipe to replace a defective rock bit and a substantial portion of such replacements are necessitated by seal failure.

2. Description of the Prior Art

Rock bit bearing seals based on a radially disposed belleville washer, with at least the peripheral lips being encased within an elastomer, are well known in the art. U.S. Pat. No. 3,137,508 teaches the use of this type of seal. A belleville washer behaves as a stiff spring with small deflection in the axial direction.

As wells were drilled ever deeper, and in smaller diameters, it became desirable to rotate the drill faster. The radially disposed belleville seal, due to its relatively large outside diameter, is disadvantaged at higher rotary speeds.

U.S. Pat. No. 3,397,928 shows the use of a common O-ring to seal the bearing of a rolling cone rock bit, minimizing the rubbing velocity between the seal and rock bit surfaces.

To develop sufficient contact pressure against rock bit surfaces, this seal is compressively deformed in its housing gland by an amount which materially shortens its useful life.

The high unit load represented by this contact pressure contributes to abrasive wear of both the O-ring and the gland. This wear serves to reduce the pressure or squeeze of the O-ring as designed.

The elastomeric material of the O-ring, as it is stored in the deformed condition, takes a set or a permanent deformation, materially reducing the contact pressure.

The deformed O-ring, as installed, lacks the compliability of the belleville seal in response to displacements in the relationship of the cutter cone to the journal.

SUMMARY OF THE INVENTION

It is the object of this invention to provide a heavy-duty environmental radial shaft seal with a lengthened useful life expectancy and with physical proportions similar to those of an O-ring.

Another object of this invention is to provide a seal with improved compliability to displacements arising from bearing clearances and deflections.

Still another object of this invention is to provide a seal operable with less contact pressure and less compressive deformation than is required by an O-ring seal.

The seal of the present invention is similar to an O-ring in general proportion but the form and function are best compared to a belleville seal, hence, it is called a "radial belleville seal".

The stiff spring action of a belleville washer provides contact pressure and compliability in a conventional belleville washer seal.

Analogous functions are provided in the seal of this invention by a spring of different form and the novel spring acts in a radial rather than the axial direction of a true belleville spring.

The spring of this present invention consists of a continuous, narrow, cylindrical band with spring fingers extending axially from both edges.

The spring is encapsulated in a plastic or elastomeric compound to form a seal ring. The seal ring forms elementally a frustum of a cone wherein the largest outside diameter is larger by a predetermined amount than the seal gland and the smallest inside diameter is smaller by a predetermined amount than the seal gland. The two annular edges thus defined are the active seal contact edges of the seal ring. Contact pressure of these edges against the seal gland surfaces is generated by the internal spring rather than by compressive deformation of the elastomeric seal body.

An advantage of this invention is a reduction in seal contact pressure. This occurs because of the relatively minor contribution of the elastomer of the present seal to generate contact pressure. The relatively thin section of elastomer is compressed through the spring action of the seal within the seal gland as opposed to a compaction of a seal packing within a seal gland as is taught in the prior art.

Another advantage of this invention is a reduction in abrasive wear to seal ring and gland, resulting from the reduction in initial contact pressure required by this seal.

Yet another advantage of this invention is the capacity of this seal to compensate for eccentric displacements of seal gland surfaces resulting from bearing clearances and deflections.

The above noted objects and advantages of the present invention will be more fully understood upon a study of the following description in conjunction with the detailed drawings.

BREIF DESCRIPTION OF THE DRAWINGS

DESCRIPTION OF THE PREFERRED EMBODIMENTS AND BEST MODE FOR CARRYING OUT THE INVENTION

Figure 1:
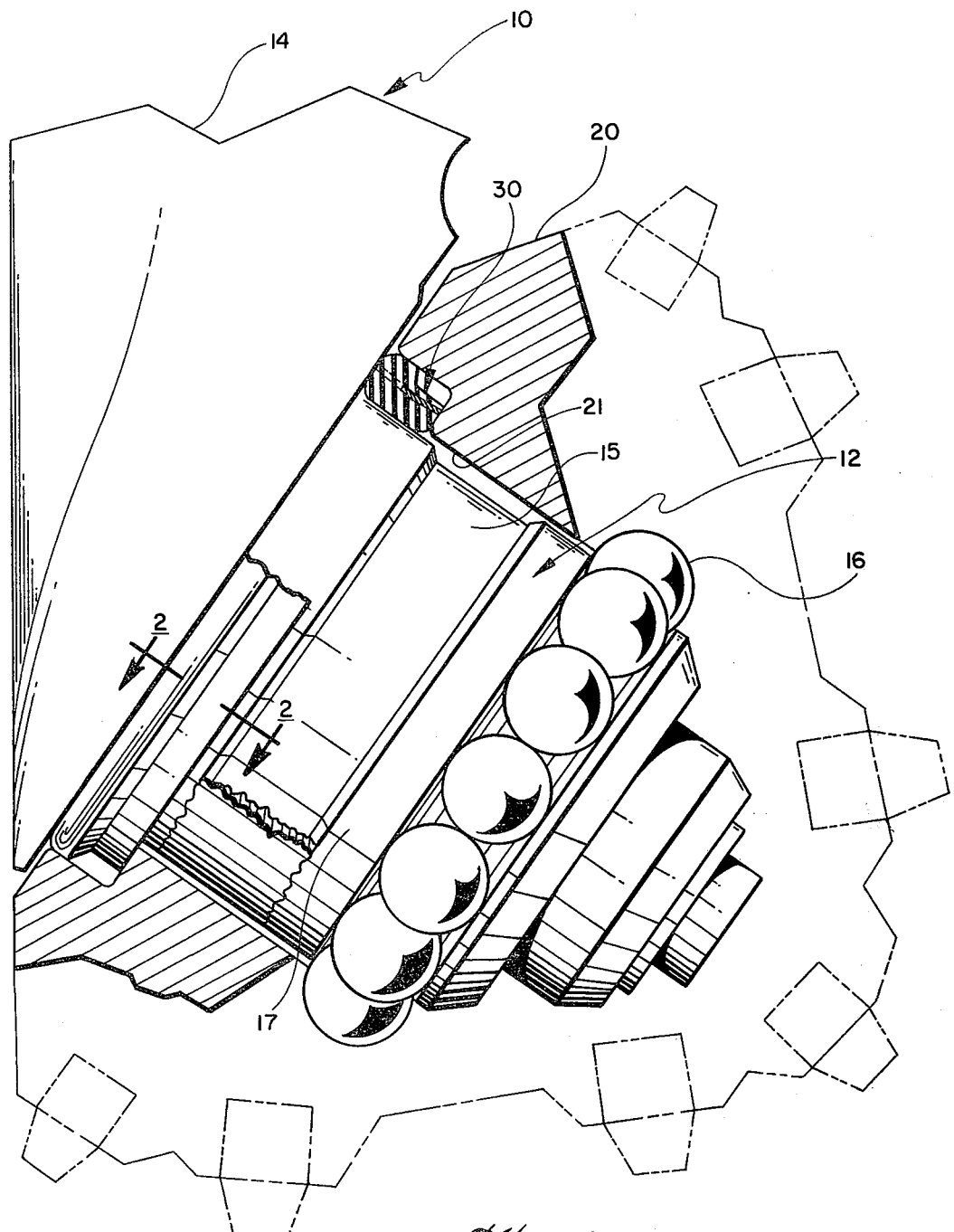
FIG. 1 is a partial section of a cutter cone of a sealed bearing rock bit showing the journal, the seal and part of the rock bit body.

In FIG. 1, a portion of the cutting end of a rock bit, generally designated as 10, is comprised of a leg portion 14 supporting a cantilevered journal 12. A rock cutter cone 20, shown in partial section, is retained on the journal 12 by bearing balls 16. Lubricant is retained within the cone 20 between cone bearing 21 and journal bearing 17 by a seal, generally designated as 30, which also excludes fluids within the borehole from entering between the journal 12 and the cone 20. A reservoir of lubricant is provided in channel 15 of journal 12.

Figure 2:
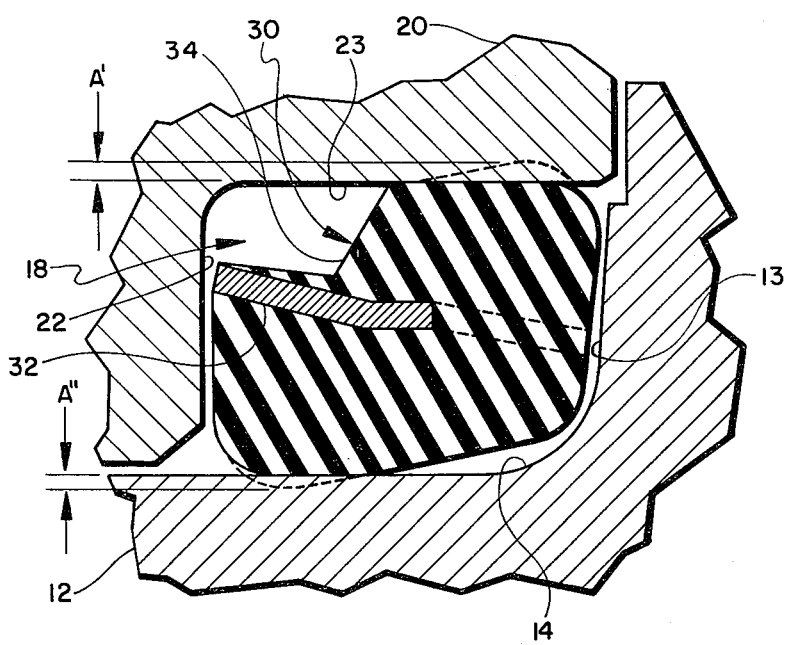
FIG. 2 is an enlarged section taken through 2—2 of FIG. 1, illustrating the seal installed in the gland.

Turning now to FIG. 2, the annular seal gland groove, generally designated as 18, is defined by the two axially extending sealing surfaces: the journal sealing surface 14 and the cone sealing surface 23, and two radially extending surfaces: the cone radial wall 22 and the journal radial wall 13. The seal ring 30 comprises an annular cylindrical spring 32 which is encapsulated within the resilient seal body 34. The annular spring 32 is preferably a cylinder, however, the annular spring could be a truncated cone.

Figure 3:
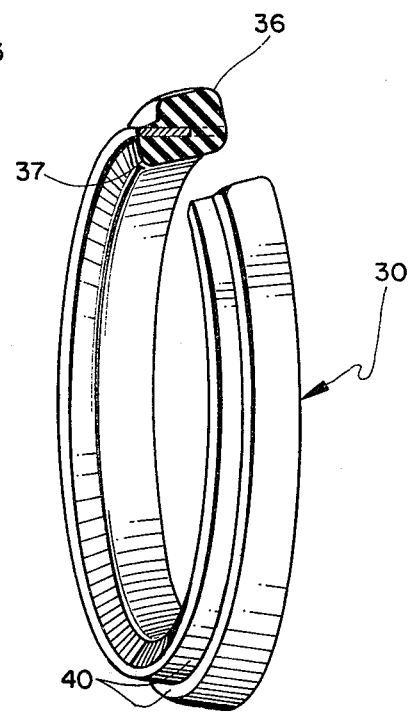
FIG. 3 is a partially broken away perspective view of the seal ring.

FIG. 3 illustrates the seal ring in a relaxed state before installation. Corners 36 and 37 identify the sealing edges, acting within gland 18 (FIG. 2).

Figure 4:
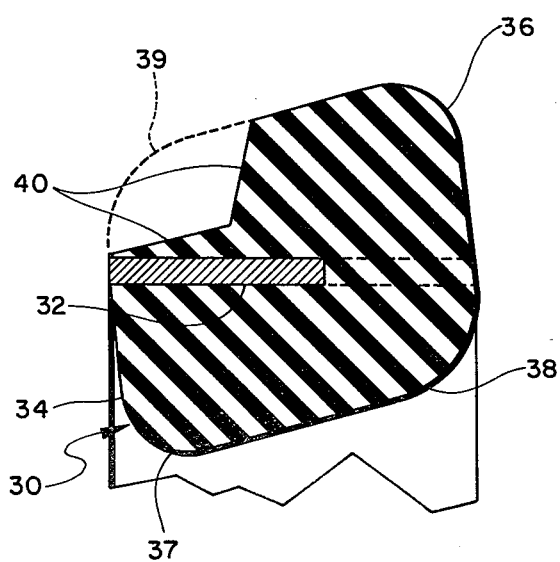
FIG. 4 is an enlarged cross section of the seal ring in an unconstrained condition.

FIG. 4 is an enlarged view of the cross section of FIG. 3. Corners 38 and 39 are normally not in contact with the seal gland 18, being non-sealing corners. Corner 39 may, however, be additionally formed in sunk relief to surface 40. This preferred relief insures that corner 37 has a lower contact pressure than has corner 36. Corner 36, therefore, is preferentially a dynamic seal.

Figure 5:
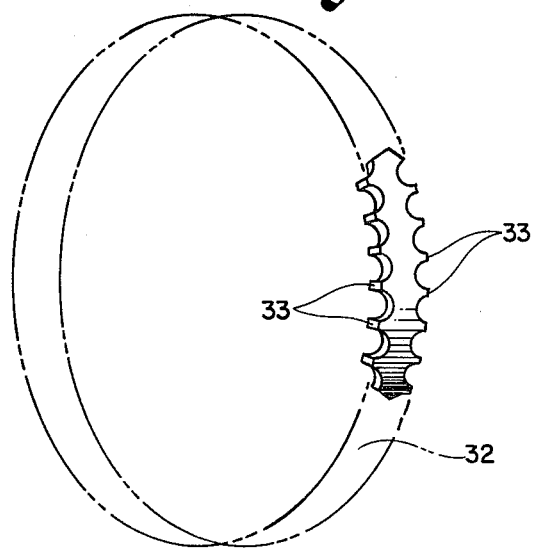
FIG. 5 illustrates the internal spring.

FIG. 5 depicts the preferred cylindrical steel band spring 32 with a pattern of axially aligned, equidistantly spaced flexible fingers 33. As depicted, the fingers 33 on one edge of spring 32 are staggered from the fingers on the opposing edge in the manner presently favored. It would of course be an obvious alternative to provide fingers directly across from opposing fingers, or in some other predetermined pattern.

It would additionally be obvious to fabricate the resilient cylindrical band from, for example, fiberglass, plastic or other springlike material.

Deformations of the seal ring 30, designated as A' and A" in FIG. 2, and arising from containment within the seal gland groove 18, result primarily from deflections of individual steel fingers 33 of cylindrical spring 32 and, to a minor extent, from compressive deformations of those portions of the resilient seal body 34 which are squeezed between the fingers 33 and surfaces 14 and 23 of the seal gland groove 18. These pressures, for example, exerted against gland 18 may be from 150 pounds per square inch (psi) to 250 psi. A preferred pressure range is from 100 psi to 200 psi.

This seal is useful in any machine having one member rotatably mounted with respect to another with an annular seal gland groove of substantially rectangular cross section requiring a heavy-duty resilient dynamic seal packing ring rotatable therein.

In the relaxed condition, this seal packing ring has a cross-sectional form of a parallelogram radially displaced so that the radial dimension of the cross section exceeds that of the gland. The two extreme diagonally opposite sealing corners 36 and 37 of the parallelogram are elastically deformed compressively toward a substantially rectangular cross-sectional form for installation in the seal gland groove 18 wherein corners 36 and 37 form a couple biased against the axially extending concentric surfaces of the seal gland grooves 14 and 23.

A sealed bearing rock bit with at least one cutter cone rotatably mounted with respect of a journal extending from the bit body is a specific example of such a machine.

Encapsulated substantially centrally within the resilient parallelogram cross section is a core member of a relatively stiff resilient cylindrical band 32, extending axially substantially through the cross section. The spring steel band 32 is continuous in the axially central portion with equidistantly spaced flexible fingers 33 extending in both axial directions by less than half the width of the band, both annular edges of the band 32 forming a substantially similar pattern of fingers 33.

In the parallelogram cross section, the two extreme diagonally opposite corners 36 and 37 are the sealing surfaces. The two mean diagonally opposite corners 38 and 39 are substantially nonfunctional as sealing surfaces. The radially outboard mean corner 39 is, for example, formed in sunk relief 40 in the preferred embodiment. The relieved corner 39 serves to reduce the contact pressure against the shaft member of the gland to a small extent. At any one time during rotation, one sealing corner will be static and the other will be dynamic. The relief 40 is used to encourage the smaller diameter sealing edge to be the dynamic seal to control the seal function and to minimize seal to gland wear.

In the presently preferred embodiment, the spring steel band 32, comprising the core member, is encapsulated in an elastomeric body 34, forming a continuous annular seal ring 30. The preferred elastomer is nitrile of about Shore A 70 to 95. Obviously, other rubberlike resilient material, such as, plastic, could be used without departing from the teachings of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. In a machine having a first member rotatably mounted with respect to a second member defining therebetween an annular seal gland groove, an annular resilient seal packing ring rotatable in said seal gland groove, said annular seal packing ring in a relaxed condition having a cross-sectional form of a parallelogram displaced radially with a total radial cross-sectional dimension greater than a radial cross-sectional dimension of said seal gland groove, said annular seal packing ring having in cross section two extreme diagonally opposite corners biased against said axially extending annular surfaces formed between said first and second members, said packing ring forming a couple, said packing ring having a resilient core member encapsulated within said ring, said packing ring being elastically deformable in cross section when confined within said seal gland groove from said parallelogram form toward a substantially rectangular form of reduced radial cross-sectional dimension.

2. In a machine having a first member rotatably mounted with respect to a second member defining therebetween an annular seal gland groove with one axially extending surface and one radially extending surface formed by said first member and with one radially extending surface and one axially extending surface formed by said second member, an annular resilient seal packing ring rotatable in said seal gland groove, said annular seal packing ring in a relaxed condition having a cross-sectional form of a parallelogram displaced radially with a total radial cross-sectional dimension greater than a radial cross-sectional dimension of said seal gland groove, said annular seal packing ring having in cross section two extreme diagonally opposite corners biased against said axially extending annular surfaces formed between said first and second members, said packing ring forming a couple, said packing ring having a resilient core member encapsulated within said ring, said packing ring being elastically deformable in cross section when confined within said seal gland groove from said parallelogram form toward a substantially rectangular form of reduced radial cross-sectional dimension.

3. In a sealed bearing rock bit having at least one cutter cone rotatably mounted with respect to a journal extending from a body of said rock bit, said journal and said cone defining therebetween an annular seal gland groove with one axially extending surface and one radially extending surface formed by said journal and with one radially extending surface and one axially extending surface formed by said cone, an annular resilient seal packing ring rotatably mounted in said seal gland groove, said annular seal packing ring in a relaxed condition having a cross-sectional form of a parallelogram displaced radially with a total radial cross-sectional dimension greater than a radial cross-sectional dimension of said seal gland groove, said annular seal packing ring forming in cross section two extreme diagonally opposite corners biased against said axially extending concentric gland surfaces formed between said cone and said journal, said packing ring forming a couple, said packing ring having a resilient core member encapsulated within said ring, said seal packing ring being elastically deformable in cross section when confined within said seal gland groove from said parallelogram form toward a substantially rectangular form of reduced radial cross-sectional dimension.

4. The invention as set forth in claims 1, 2 or 3 wherein said annular seal packing ring core member is a resilient annular band of a relatively stiff material encapsulated within said parallelogram cross section of said seal, said annular band having a diameter substantially intermediate to diameters of said axially extending surfaces of said seal gland groove, said band further comprising first and second annular edges with a multiplicity of equidistantly spaced, axially oriented and oppositely directed fingers formed in said band, said fingers extend axially by less than half of a width of said band.

5. The invention as set forth in claim 4 wherein said resilient annular band is substantially a cylinder.

6. The invention as set forth in claim 5 wherein said resilient cylindrical band is fabricated from metal.

7. The invention as set forth in claim 6 wherein said resilient cylindrical band is fabricated from steel.

8. The invention as set forth in claim 5 wherein said fingers of said cylindrical band exert sufficient internal bias of said two extreme diagonally opposite corners of said seal packing ring against said axially extending surface of said seal gland groove to provide sufficient sealing contact pressure of said corners against said surfaces of said gland and to accommodate reasonable eccentricity occurring between said members.

9. The invention as set forth in claim 8 wherein said contact pressure of said corners of said seal packing ring against said surfaces of said gland is from about 150 pounds per square inch to about 250 pounds per square inch.

10. The invention as set forth in claim 8 wherein said contact pressure is front about 100 pounds per square inch to about 200 pounds per square inch.

11. The invention as set forth in claims 1, 2 or 3 wherein said resilient seal packing ring is formed of an elastomeric material.

12. The invention as set forth in claim 11 wherein said elastomeric material is nitrile.

13. The invention as set forth in claim 11 wherein said elastomer has a durometer hardness of about Shore A 70 to 95.

14. The invention as set forth in claim 13 wherein said durometer hardness is about Shore A 80.

15. The invention as set forth in claims 1, 2 or 3 wherein said parallelogram cross-sectional shape forms two diagonally extreme opposite corners, a first corner being radially inboard and a second corner being radially outboard, and two diagonally mean opposite corners, a third corner being radially adjacent to said first corner and a fourth corner being radially adjacent to said second corner, said first and second corners forming primary sealing surfaces.

16. The invention as set forth in claim 15 wherein said third corner is formed in sunk relief thus providing less radial bias to said first corner than is provided to said second corner, said first corner preferentially operates as a dynamic seal and said second corner operates substantially as a static seal.

17. In a sealed bearing rock bit having at least one cutter cone rotatably mounted with respect to a journal extending from a body of said rock bit, said journal and said cone defining therebetween an annular seal gland groove, an annular resilient seal packing ring rotatably mounted in said seal gland groove, said annular seal packing ring having a cross-sectional form of a parallelogram displaced in a radial direction forming two extreme diagonally opposite corners representing a greater radial span than does said seal gland groove, a resilient cylindrical band encapsulated substantially centrally within said annular seal packing ring, said band forming a multiplicity of substantially equidistantly spaced fingers in a predetermined pattern extending axially both directions from about the center of said cross-sectional form, said fingers exert sufficient internal bias on each of two extreme diagonally opposite sealing corners of said seal packing ring against said axially extending surfaces of said seal gland groove to maintain sealing contact pressure of said sealing corners, said extreme opposite sealing corners forming a couple between said members, said seal packing ring being elastically deformed in cross section from said parallelogram form toward a substantially rectangular form of reduced radial dimension when confined within said seal gland groove.

* * * * *